Patented June 8, 1954

2,680,685

UNITED STATES PATENT OFFICE 2,680,685

INHIBITION OF COLOR FORMATION IN N,N-BIS(2-HYDROXYETHYL) LACTAMIDE

William P. Ratchford, Philadelphia, Pa., assignor to the United States of America as represented by the Secretary of Agriculture No Drawing. Application April 10, 1951,
Serial No. 220,327

9 Claims. (Cl. 92—21)

(Granted under Title 35, U. S. Code (1952), sec. 266)

The invention herein described may be manufactured and used by or for the Government of the United States of America for governmental purposes throughout the world without the payment to me of any royalty thereon.

This invention relates to the color stabilization of N,N-bis-(2-hydroxyethyl) lactamide by incorporation therein of certain alkali salts of sulfur acids.

N,N-bis-(2-hydroxyethyl) lactamide, a compound readily obtained from methyl lactate and diethanolamine, is a non-volatile, hygroscopic water soluble oil, which is useful as a softening agent and humectant in the manufacture of certain types of paper. However, on exposure to water and air at the elevated temperatures encountered in the manufacture of paper, this compound undergoes discoloration and thus imparts an undesirable yellow tint to the paper. We have found that addition of alkali salts of sulfurous or of hyposulfurous acid effectively inhibits this color formation.

The mixture of the lactamide and salt may be added to the beaten pulp at the wet end of the paper-making machine, or it may be added as an ingredient of the sizing or impregnating agents.

Paper treated with N,N-bis-(2-hydroxyethyl) lactamide alone tends to discolor when it passes over heated drying and calendering rolls, but paper treated with the lactamide-salt mixture does not so discolor.

The following examples illustrate the invention:

Example I

An aqueous solution of N,N-bis-(2-hydroxyethyl) lactamide containing 1.5 percent, on the basis of the weight of the lactamide, of sodium sulfite ($Na_2SO_3$) was exposed to a stream of air at 95° for 48 hours. The product thus obtained was water-white, whereas a similarly treated solution containing no sodium sulfite was dark yellow.

Example II

The procedure of Example I was repeated (except that the test was run for 24 hours) using 1 percent of sodium hyposulfite ($Na_2S_2O_4$) in place of the sulfite. The product so obtained was water-white, whereas the untreated sample was yellow.

Example III

The procedure of Example II was repeated using 0.2 percent of sodium bisulfite ($NaHSO_3$). The treated product was practically water-white, while the control was yellow.

Example IV

An aqueous solution of N,N-bis-(2-hydroxyethyl)-lactamide containing 0.5 percent sodium bisulfite, on the basis of the weight of lactamide, was evaporated by heating at 150° C. in a current of air for 1 hour. The product so obtained was water-white.

Having thus described my invention, I claim:

1. The process of inhibiting the discoloration of N,N-bis(2-hydroxyethyl) lactamide on heating in the presence of water and air which comprises incorporating therein a salt selected from the group consisting of sodium sulfite, sodium bisulfite and sodium hyposulfite.

2. The process of claim 1 wherein the salt is sodium bisulfite.

3. The process of claim 2 wherein inhibition of discoloration is effected by incorporation of from about 0.2 to about 0.5 percent by weight of sodium bisulfite.

4. In a paper making process employing as a softening agent N,N-bis-(2-hydroxyethyl) lactamide at elevated temperatures in the presence of water and air, the improvement comprising inhibiting the discoloration of the paper by mixing with said lactamide a salt selected from the group consisting of sodium sulfite, sodium bisulfite, and sodium hyposulfite.

5. The process of claim 1 in which the salt is from 0.2 to 1.5 percent by weight of the lactamide.

6. A color stable composition comprising as its essential ingredient N,N-bis-(2-hydroxyethyl) lactamide and, as an inhibitor of discoloration therefor, a salt selected from the group consisting of sodium sulfite, sodium bisulfite and sodium hyposulfite.

7. The composition of claim 6 wherein the salt is sodium bisulfite.

8. The composition of claim 7 wherein the sodium bisulfite amounts to 0.2 to 0.5%, by weight, of the N,N-bis-(2-hydroxyethyl) lactamide.

9. Paper softened with a color stable composition comprising as its essential ingredient N,N-bis-(2-hydroxyethyl) lactamide and, as an inhibitor of discoloration, a salt selected from the group consisting of sodium sulfite, sodium bisulfite and sodium hyposulfite.

References Cited in the file of this patent

UNITED STATES PATENTS

| Number | Name | Date |
|---|---|---|
| 2,041,436 | Schulemann et al. | May 19, 1936 |
| 2,055,064 | Bochmuhl et al. | Sept. 22, 1936 |
| 2,130,322 | Kharasch | Sept. 13, 1938 |
| 2,155,731 | Mitchell | Apr. 25, 1939 |
| 2,170,845 | Woodhouse | Aug. 29, 1939 |
| 2,377,359 | Musher | June 5, 1945 |
| 2,458,420 | Reynolds et al. | Jan. 4, 1949 |
| 2,473,339 | Kirchmeyer et al. | June 14, 1949 |
| 2,535,363 | Koch | Dec. 26, 1950 |

FOREIGN PATENTS

| Number | Country | Date |
|---|---|---|
| 54,206 | Germany | Oct. 20, 1890 |

OTHER REFERENCES

Ratchford, Ind. & Eng. Chem., August 1950, page 1567.